Sept. 23, 1941.　　　　L. M. KLEIN　　　　2,256,981
SELF-DEVELOPING CAMERA
Filed July 31, 1940　　　3 Sheets-Sheet 1
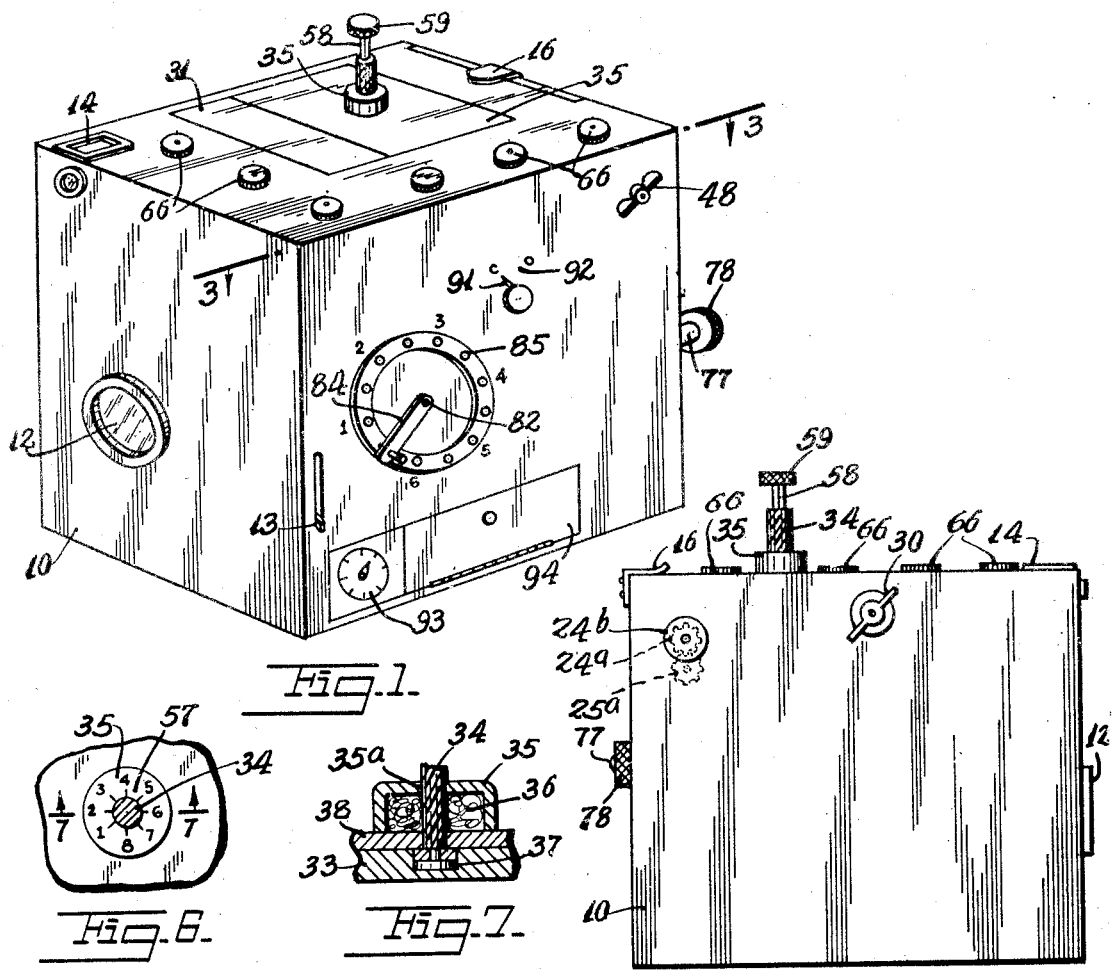
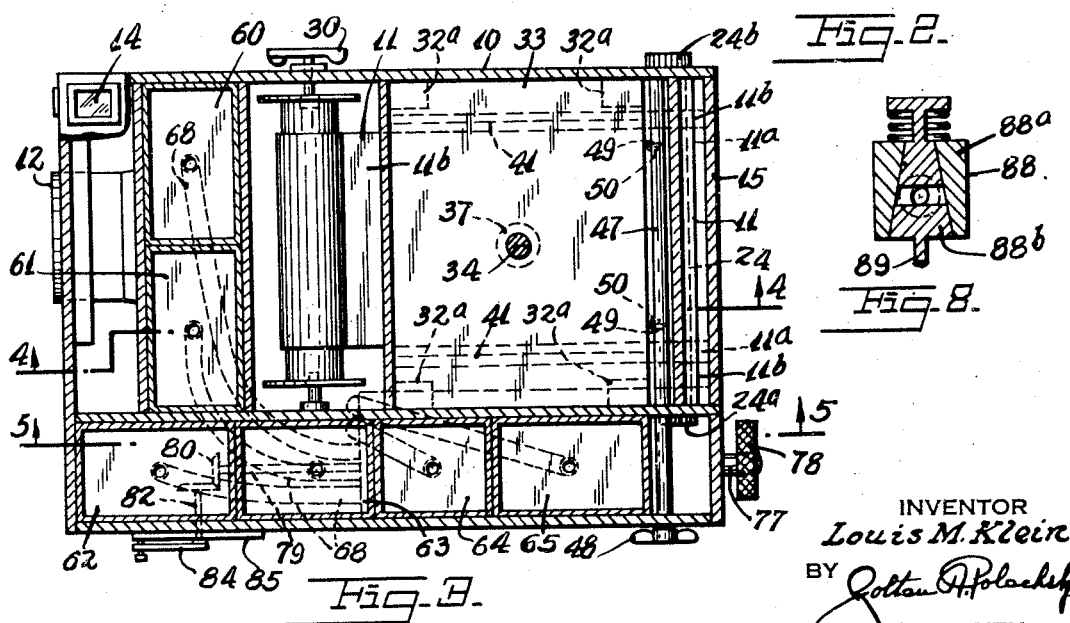
INVENTOR
*Louis M. Klein*
BY
ATTORNEY

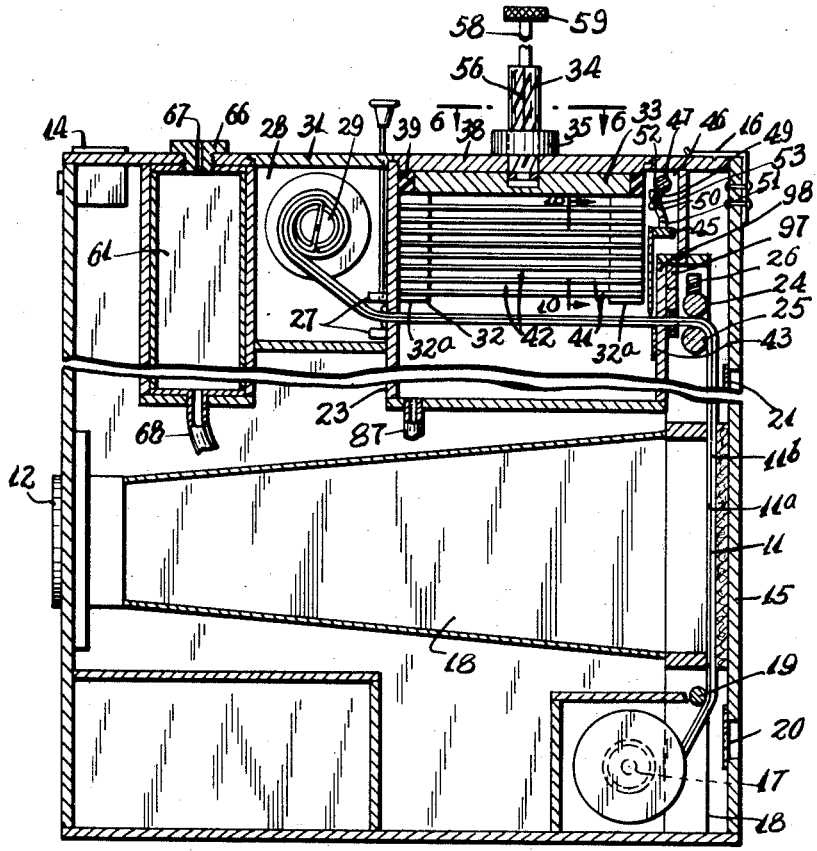
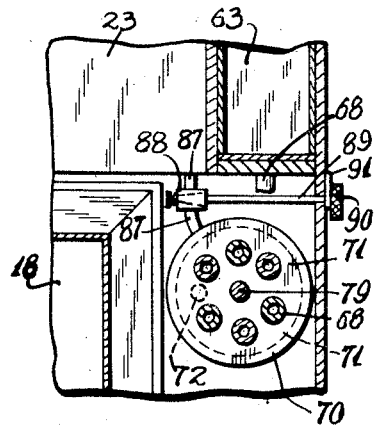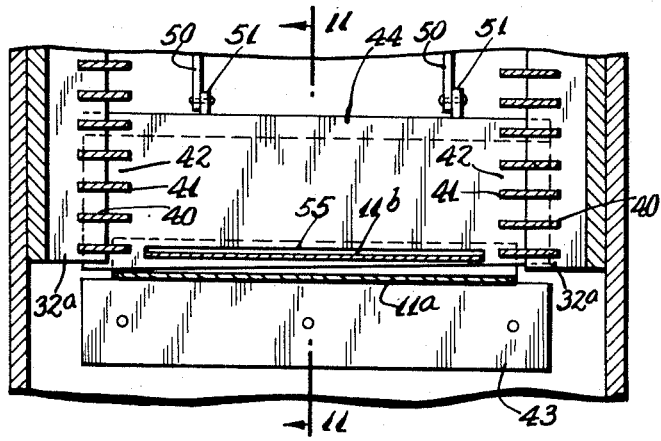

Sept. 23, 1941.   L. M. KLEIN   2,256,981
SELF-DEVELOPING CAMERA
Filed July 31, 1940   3 Sheets-Sheet 3

INVENTOR
Louis M. Klein
BY
ATTORNEY

Patented Sept. 23, 1941

2,256,981

UNITED STATES PATENT OFFICE 2,256,981

SELF-DEVELOPING CAMERA

Louis M. Klein, New York, N. Y.

Application July 31, 1940, Serial No. 348,644

14 Claims. (Cl. 95—13)

This invention relates to new and useful improvements in a camera and has more particular reference to a self-developing camera.

The invention proposes a self-developing camera characterized by a camera adapted to use a roll of film, a tank within the camera, a rack for engaging into said tank, and means operable from the outside of the camera for cutting off exposed sections of film and placing them in said rack in separated positions, and for supplying developer fluid, cleaning solution, water, fixer, and the like, selectively to the tank for the purpose of developing, washing, fixing, etc., the film.

Still further the invention proposes to so construct the camera that pictures may be taken directly on paper and developed, etc., if this is desired.

Still further the invention proposes to construct the rack of a sufficient capacity to hold a predetermined number of pictures or films cut from the roll; for example, for a standard eight picture roll of film it is proposed that the rack be capable of holding the eight pictures.

Still further the invention proposes the construction of a camera as mentioned which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of the camera constructed in accordance with this invention.

Fig. 2 is a rear elevational view of Fig. 1.

Fig. 3 is a horizontal sectional view taken on the line 3—3 of Fig. 1.

Fig. 4 is a fragmentary vertical sectional view taken on the line 4—4 of Fig. 3.

Fig. 6 is a fragmentary horizontal sectional view taken on the line 6—6 of Fig. 4.

Fig. 7 is a fragmentary vertical sectional view taken on the line 7—7 of Fig. 6.

Fig. 8 is a fragmentary horizontal sectional view taken on the line 8—8 of Fig. 5.

Fig. 9 is a fragmentary vertical sectional view taken on the line 9—9 of Fig. 5.

Fig. 10 is a fragmentary enlarged vertical sectional view taken on the line 10—10 of Fig. 4.

Figure 5:
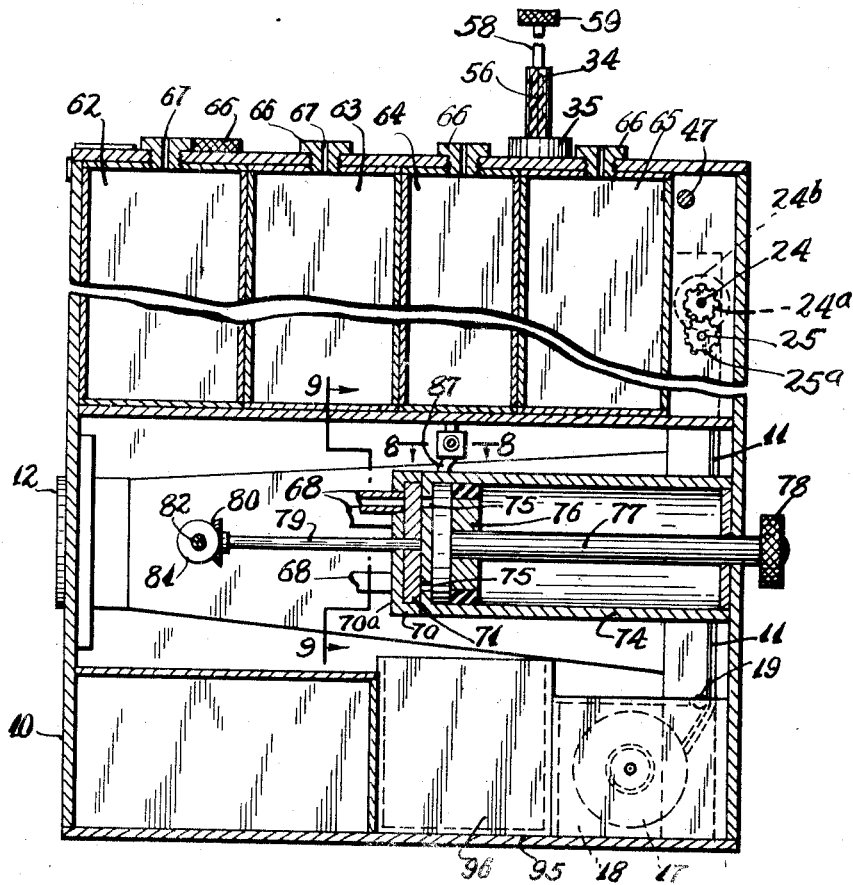
Fig. 5 is a fragmentary vertical sectional view taken on the line 5—5 of Fig. 3.

The self-developing camera in accordance with this invention includes the usual camera 10 adapted to use a roll of film 11. The details of the camera will not be given in this specification since it forms no part of the invention. However, a few of the more important parts will now be pointed out.

The camera 10 has the usual lens and shutter 12 which is operated by some type of known operator 13. It has the usual finder 14. It is provided with a back cover 15 which is openable so that the film 11 may be placed into the camera. The back cover 15 is normally held closed by a clip 16, or other holding device. The film 11 has a layer of film material 11$^a$ and a covering layer of paper or other sheet material 11$^b$. These layers are rolled into the usual roll on the usual spool.

The supply spool 17 for the film is mounted in the usual way in a receiving compartment 18. The film 11 is extended up across the usual lightproof compartment 18 having the lens and shutter mechanism 12 at its front end. The film 11 is guided by several rollers 19. The back cover 15 is provided with the usual piece of red glass 20 so that the numbers on the film may be viewed. This glass 20 is located to the bottom of the compartment 18. An auxiliary piece of red glass 21 is also mounted on the back cover 15 above the compartment 18.

A tank 23 for developing, washing, bleaching, and fixing fluids is mounted within the camera. There is means for guiding the film 11 across the top of this tank. This guiding means includes a pair of rollers 24 and 25 mounted to one side of the tank 23 between which the film 11 passes. The top roller 24 is resiliently mounted to resiliently engage the film 11. Several springs 26 act between portions of the camera body and the roller 24, or bearings for this roller, for accomplishing the said resilient mounting thereof. At one side of the roller 24, a turning knob 24$^b$ is provided. This knob is externally located from the camera for turning the roller 24 and for moving the film 11. The other end of the roller 24 is provided with a gear 24$^a$ which meshes with a complementary gear 25$^a$ secured to the shaft of the roller 25 so that when the roller 24 is rotated by the knob 24b, the roller 25 will also rotate at the same rate of speed to feed film 11.

The film 11 after crossing the top of the tank 23 engages between a pair of resilient light-proof strips 27 mounted on the wall of a compartment 28 which contains a winding-up spool 29 for the paper 11b of the film. This wind-up spool 29 is connected with the usual winding stem 30 mounted upon the outside of the camera. A light-proof cover 31 closes the compartment 28.

A rack 32 for engaging into the tank 23 is mounted within the camera directly above the tank. This rack includes a top plate 33 which is supported by a screw 34. This screw passes out through a cap 35 mounted on the top of the camera. The cap 35 is formed with a threaded opening 35a into which the screw 34 threadedly engages. The cap 35 is filled with light-proof packing material 36. The screw 34 has a bottom flanged portion 37 which is rotatively mounted in the top plate 33. The rack 32 is arranged within a compartment in the camera which is normally closed with a cover 38. The rack 32 is mounted on this cover. The plate 33 is provided with light-proof material 39 at its edges engaging the faces of the walls forming the compartment above the tank 23.

The rack 32 includes four vertical corner posts 32a which depend from the plate 33. The corner posts 32a on one side of the film 11 are formed with grooves 40 engaged by strips 41 forming grooves 42 between adjacent strips 41. Similarly, the posts 32a on the other side of the film 11 are constructed with grooves 40 in which strips 41 engage. These strips 41 form grooves 42 between adjacent strips 41. The film layer 11a is of a width so as to be engageable into the grooves 42 as may be understood by examining Fig. 10. The paper cover layer 11b of the roll of film is narrower than the film layer 11a so that it passes between the free edges of the strips 41.

There is means for cutting off the film layer 11a after it has assumed a position upon the rack 32. This means includes a stationary blade 43 stationarily mounted on the inner face of one of the walls of the tank 23. This stationary blade 43 is cooperative with a movable blade 44 located directly above it. The movable blade 44 is supported at a block 45 which is slidably mounted in a compartment 46 within the camera. A shaft 47 extends through the compartment 46 and has one of its ends projecting from the body of the camera. This projecting end is provided with a handle 48. The shaft 47 has several downwardly and forwardly extending arms 49 cooperative with upwardly and forwardly extending arms 50 pivotally mounted on the block 45. More specifically, the arms 50 are pivotally mounted on lugs 51 mounted on the block 45. The arms 49 are formed with slots 52 which are engaged by pins 53 projecting from the arms 50. The slots 52 are quite short, so that there is a little slack only. The arrangement is such that the handle 48 may be turned to cause the arms 49 to move the arms 50 which in turn move the top blade 44 downwards. This action moves the blade 44 across the blade 43 to cut the film layer 11a. The blade 44 is formed with an opening 55 through which the paper layer 11b passes. For this reason the paper 11b is not cut when the film layer is cut.

An arrangement is provided for moving the rack 32 in steps into the tank 23, to place the various pairs of opposed grooves 42 in position to receive sections of the cut film. This means includes the screw 34 previously referred to. There is a longitudinal scratch line 56 formed along the length of the screw 34 and indicating in conjunction with a scale 57 formed upon the top of the cap 35 around the screw 34. This scale 57 is divided into nine equal parts which are numbered one to eight, and the ninth is provided with the letter "S", indicating the starting point. When the screw 34 is in its completly raised position, then the rack 32 is completely raised, the scratch line 56 will be aligned with the letter "S".

The screw 34 is provided with reduced neck portion 58 having a knob 59 at its top. The knob 59 may be turned to turn the screw. When the scratch line 56 aligns with numeral "1" on the scale 57, the rack 32 is in its first step lowered position. In this way the screw 34 may be turned around until the eight additional positions of the rack 32 have been reached. Thereafter, screw 34 becomes free from the threaded portion 35a of the cap 35, and the rack 32 drops into the tank 23. Knob 59 may then be reciprocated upwards and downwards so as to stir the rack 32 in the tank 23 to agitate the fluid therein, for better developing, washing, fixing, etc.

A plurality of containers 60, 61, 62, 63, 64 and 65 are mounted within the body of the camera at advantageous positions, preferably along one side and one end. Each of these containers has a top opening normally closed with a removable cap 66. Each cap 66 has a vent opening 67 through which air may pass when the liquid of the container is drawn out. Each of these containers has a pipe 68 connected with its bottom end. These pipes connect with the end 70a of a casing 70. The pipes 68 are arranged in a circle coaxially of the casing 70. A valve 71 is mounted in the casing 70 and is adapted to close the ends of all of the pipes 68. This valve 71 comprises a disc formed with one opening 72, see Fig. 9, adapted to be selectively aligned with the ends of the pipes 68. The pipes 68 are arranged in a circle coaxially about the casing 70 at points representing one-sixth of the arcuate distance along said circle. The arrangement is such that the six pipes 68 are arranged equally spaced from each other about the axis of the casing 70.

The closed position of the valve 71 is any position in which the opening 72 is in between a pair of adjacent pipes 68. The valve 71 controls entrance of fluid through the pipe 68 into a cylinder 74. This cylinder is coaxially arranged with the casing 70. The end of the cylinder is provided with six openings 75 which are aligned with the six pipes 68; thus the valve 71 is capable of connecting any one of the six pipes 68 with the cylinder 74. A piston 76 is slidably mounted in the cylinder 74, and is connected with a piston rod 77 extending coaxially through the cylinder 74 to the outside of the body of the camera. The outside end of the rod 77 is provided with a handle 78 by which the piston 76 may be operated. When the handle 78 is completely inwards, the piston 76 will be against the end of the cylinder 74 having the openings 75, thus closing all of these openings. When the valve 71 is turned to its various positions, the piston 76 in its latter position will prevent liquid from the various pipes 68 from entering the cylinder 74.

The valve 71 is controlled by a valve rod 79 which is rotatively supported and which is provided with a bevel gear 80 meshing with the bevel gear 81 on a stem 82 extending to the exterior of the body of the camera. This stem 82 is provided with a handle 84 at its outer end. This handle 84 indicates over a scale 85 mounted upon the outside of the camera body. The scale 85 is divided into six positions indicated by reference numerals 1 to 6, and central points in between adjacent numerals indicate positions of the valve 71. With this arrangement, the handle 84 may be placed in any one of the six positions to connect any one of the pipes 68 with the cylinder 74, or to any one of six intermediate positions to cut off all of the pipes 68 from the cylinder 74.

A pipe 87 is connected with the inner end of the cylinder 74 and extends upwards and connects with the tank 23. This pipe 87 is controlled with a valve 88. The valve 88 has two positions, one open, and the other closed. The valve 88 comprises a valve body 88$^a$ in which a valve proper 88$^b$ is turnably mounted. This valve proper 88$^b$ is connected with a stem 89 which has a knob 90 upon its outer end. The knob 90 is provided with a pointer 91 indicating over a scale 92 on the camera body. This scale 92 has two positions, one indicated by the letter "C" indicating closed, and the other by the letter "O" indicating open.

A time clock 93 is mounted in one portion of the camera body. The camera body also is provided with a hinged door 94 controlling a compartment 95 in which there is a drawer 96 for storing small articles.

A block 97 is mounted on a wall 98 immediately adjacent the top of the tank 23 at the side where the film 11 extends over the tank 23 as it comes out from the rollers 24 and 25. This block 97 has a felt piece 99 formed with two slots, the slot 100 and the slot 101, see Fig. 11. The paper 11$^b$ of the film passes through the slot 100 and then passes through the slot 55 in the top blade 44. The film layer 11$^a$ passes through the slot 101 and then passes in between the blades 43 and 44. This felt block 99 acts to keep the light out from the tank 23, if any light happens to reach the inside of the body of the camera.

The operation of the device is as follows:

The various tanks 60, 61, 62, 63, etc., may be filled with the liquids necessary in developing, washing, bleaching, fixing, etc., films or paper pictures. For example, developer may be placed in one tank, bleach in another, water in several of the tanks, fixer in another, and so on. The camera may then be loaded with film by opening the back cover 15, placing the spool of film in the compartment 18, threading the film up through the rollers 24 and 25, through the slots 100 and 101 across the top of the tank 23, in between the strips 27 and then upon the rewind roller 29. It is necessary that the covers 31 and 38 be opened during this threading operation. These covers are now closed and the back cover 15 is also closed. The winding stem 30 may now be turned so as to draw the paper 11 of the film farther onto the spool 29. While this is being done, the film is watched through the openings 20 and 21, until the usual notations on the film are seen through these openings. The camera is now ready to take the first picture. The picture is taken in the usual way by exposing the film to light.

Figures 11, 12, 13:
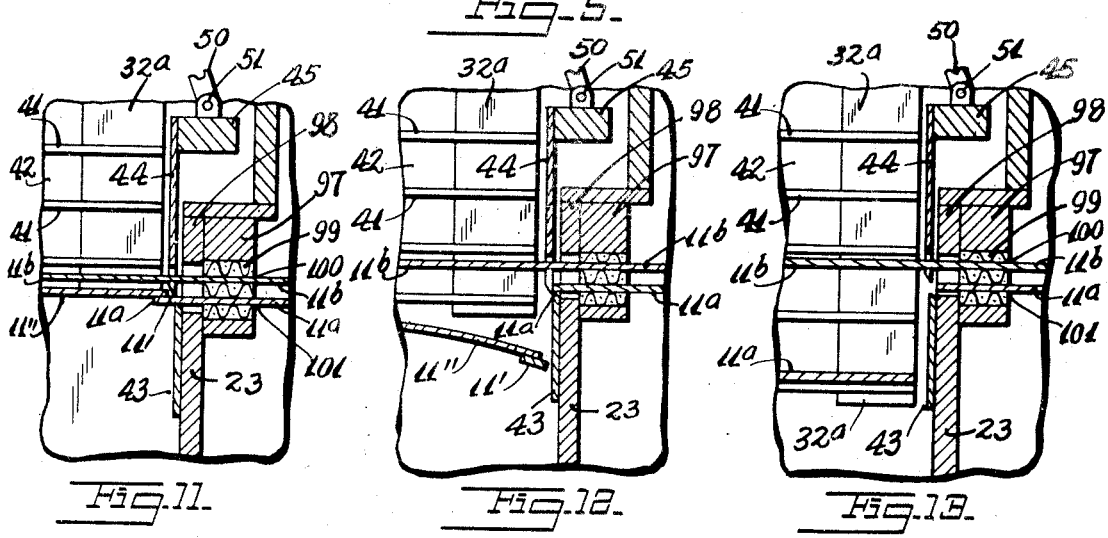
Fig. 11 is a fragmentary vertical sectional view taken on the line 11—11 of Fig. 10.
Fig. 12 is a fragmentary vertical sectional view similar to Fig. 11 but illustrating the parts in a different position.
Fig. 13 is another fragmentary sectional view similar to Fig. 11 but illustrating the parts in still another position.

After the first picture has been taken, the winding stem 30 is again turned to draw the film farther upon the spool 29. It is turned until the second numbers are viewable through the window openings. The second picture may now be taken. At this point it is best to call attention to the fact that the film will now be in the position in which it is illustrated in Fig. 11.

In this figure both layers 11$^a$ and 11$^b$ and the film are shown extended beneath the rack 32. The film layer 11$^a$ is shown as consisting of adjacent sections 11' and 11" pasted together. The section 11' represents the usual transparent film. The section 11" represents an extension of the transparent film, or a strip of paper or other material. The top edge of the first picture is now in between the knife blades 43 and 44. The handle 48 is now turned to cause the knife blade 44 to come down and cut the film 11$^a$ at the point 11', as illustrated in Fig. 11. The cut part then falls down as illustrated in Fig. 12.

The knob 59 is now turned so that the scratch line 56 indicates "1" on the scale 57. This lowers the rack 32 so that the lowermost groove 42 is immediately adjacent the cut end of the film layer 11$^a$. This is the condition of the parts as illustrated in Fig. 12. Now the knob 30 may be turned for winding up more of the film layer 11$^b$, so as to cause the film layer 11$^a$ to move outwards into the bottom-most groove 42 of the rack 32. Thus the first picture is now disposed in the bottom-most groove of the rack 32.

Another picture may now be taken by the usual exposing method. Then the handle 48 is turned to again operate the cutting blades 42 and 44 to cut free the first picture from the remaining portion of the film 11$^a$. The rack 32 is now lowered to its second position by turning the knob 59. The parts are now in the positions as illustrated in Fig. 13. The rack 32 is now in a position to receive the second picture in a way similar to that described relative to the first picture. The second picture is now placed on the rack 32. The operation is continued until all of the pictures have been taken and all of the pictures have been placed at the rack 32. The winding stem 30 is then turned around many times so as to completely wind up the cover layer 11$^b$ of the film.

The camera is now ready to develop the film. The knob 59 is now turned so as to completely engage the rack 32 into the tank 23. The knob 90 is now turned so that the pointer 91 indicates upon the letter "C". This closes the valve 88. The handle 84 is now moved to number "1" on the scale 85 or to any one of the several numbers, depending upon which container is to be connected with the tank 23. Assume that the developer is held in the container represented by number "1" of the scale 85, then the handle 84 is placed at this position. The handle 78 is now pulled outwards so that the piston 76 moves rearwards and draws the liquid from the container controlled by the valve 71 through one of the pipes 68 into the cylinder 74. The valve 71 is now moved to a closed position, by moving the handle 84 to a position between adjacent numbers on the scale 85. The knob 90 is now turned so that the pointer 91 indicates on the scale 92 the position "O"; thus opening the valve 88. The handle 78 is now forced inwards so as to force the piston 76 forwards forcing out the liquid from the cylinder 74 through the pipe 87 into the tank 23. The knob 59 is now agitated upwards and downwards to stir the liquid. The liquid is allowed to remain in the tank 23 for a predetermined time, as may be timed by the timing device 93.

The handle 78 may then be pulled outwards to draw the liquid back into the cylinder 74. The valve 88 is now closed, the valve 71 is turned so as to reconnect the pipe 68 with the container from which the liquid has been drawn, and then the handle 78 is forced inwards to pump back the liquid into the container.

In the above described manner the various containers are selectively connected with the tank 23 and the various liquids are selectively transferred to the tank 23 so as to develop, wash, bleach, fix, etc., the films or pictures in the rack 32. When the developing, etc., operation has been completed, the rack 32 is removed and the developed pictures taken from the rack.

The camera constructed in accordance with that shown on the drawings may be used with the paper 11b removed from the back of the film material 11a before the film 11 is fed into the rack 32. If this operation is followed the paper 11b is removed from the film before passing between the felt pieces 99 and the cut end of the film is fed into the rack 32 by means of the knob 24b, instead of the winding stem 30. When this knob 24b is rotated it will cause the rollers 24 and 25 to be similarly rotated due to their connection by means of the gears 24a and 25a, to cause the film to be projected as hereinabove described.

It is also possible due to the knob 24b to use a film 11 (not shown in the drawings) which does not have a backing sheet of paper as described previously. In this instance the end of the film is threaded through the rollers 24 and 25 and the cut end thereof is adapted to be projected into the rack 32 by rotating the knob 24b.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A self-developing camera, comprising a camera adapted to use a roll of film having a layer of film and a layer of paper or other sheet material rolled into a roll, a tank within said camera, means for guiding and moving said layers across said tank, a rack for engaging into said tank and having a plurality of opposed grooves between which said layer of paper may pass and into which the edges of said film layer may engage, means for cutting off sections of said film layer after engagement into certain of said opposed grooves, means for moving said rack in steps into said tank to place the various pairs of opposed grooves in position to receive sections of said film layer, containers for liquid developer, bleach, water, fixer, etc., and means for selectively connecting said containers with said tank and for pumping said liquids back and forth from said containers to said tank, and vice-versa.

2. A self-developing camera, comprising a camera adapted to use a roll of film having a layer of film and a layer of paper or other sheet material rolled into a roll, a tank within said camera, means for guiding and moving said layers across said tank, a rack for engaging into said tank and having a plurality of opposed grooves between which said layer of paper may pass and into which the edges of said film layer may engage, means for cutting off sections of said film layer after engagement into certain of said opposed grooves, means for moving said rack in steps into said tank to place the various pairs of opposed grooves in position to receive sections of said film layer, containers for liquid developer, bleach, water, fixer, etc., and means for selectively connecting said containers with said tank and for pumping said liquids back and forth from said containers to said tank, and vice-versa, said guiding and moving means including several rollers.

3. A self-developing camera, comprising a camera adapted to use a roll of film having a layer of film and a layer of paper or other sheet material rolled into a roll, a tank within said camera, means for guiding and moving said layers across said tank, a rack for engaging into said tank and having a plurality of opposed grooves between which said layer of paper may pass and into which the edges of said film layer may engage, means for cutting off sections of said film layer after engagement into certain of said opposed grooves, means for moving said rack in steps into said tank to place the various pairs of opposed grooves in position to receive sections of said film layer, containers for liquid developer, bleach, water, fixer, etc., and means for selectively connecting said containers with said tank and for pumping said liquids back and forth from said containers to said tank, and vice-versa, said guiding and moving means including several rollers, and a rewind roller with a winding stem on the outside of the camera.

4. A self-developing camera, comprising a camera adapted to use a roll of film having a layer of film and a layer of paper or other sheet material rolled into a roll, a tank within said camera, means for guiding and moving said layers across said tank, a rack for engaging into said tank and having a plurality of opposed grooves between which said layer of paper may pass and into which the edges of said film layer may engage, means for cutting off sections of said film layer after engagement into certain of said opposed grooves, means for moving said rack in steps into said tank to place the various pairs of opposed grooves in position to receive sections of said film layer, containers for liquid developer, bleach, water, fixer, etc., and means for selectively connecting said containers with said tank and for pumping said liquids back and forth from said containers to said tank, and vice-versa, said rack including a top plate, a plurality of posts depending from said plate, strips set into said posts to form grooves into which said film layer may engage.

5. A self-developing camera, comprising a camera adapted to use a roll of film having a layer of film and a layer of paper or other sheet material rolled into a roll, a tank within said camera, means for guiding and moving said layers across said tank, a rack for engaging into said tank and having a plurality of opposed grooves between which said layer of paper may pass and into which the edges of said film layer may engage, means for cutting off sections of said film layer after engagement into certain of said opposed grooves, means for moving said rack in steps into said tank to place the various pairs of opposed grooves in position to receive sections of said film layer, containers for liquid developer, bleach, water, fixer, etc., and means for selectively connecting said containers with said tank and for pumping said liquids back and forth from said containers to said tank, and vice-versa, and means for light-proofing said tank.

6. A self-developing camera, comprising a camera adapted to use a roll of film having a layer of film and a layer of paper or other sheet material rolled into a roll, a tank within said camera, means for guiding and moving said layers across said tank by handles projecting externally from the camera, a rack for engaging into said tank and having a plurality of opposed grooves between which said layer of paper may pass and into which the edges of said film layer may engage, means for cutting off sections of said film layer after engagement into certain of said opposed grooves, means for moving said rack in steps into said tank to place the various pairs of opposed grooves in position to receive sections of said film layer, containers for liquid developer, bleach, water, fixer, etc., and means for selectively connecting said containers with said tank and for pumping said liquids back and forth from said containers to said tank, and vice-versa, said means for cutting off sections of said film layer includes a shaft turnably mounted and having a projecting end provided with a handle, cutting knives for cutting said film, and means for operating said cutting knives controlled with said shaft.

7. A self-developing camera, comprising a camera adapted to use a roll of film having a layer of film and a layer of paper or other sheet material rolled into a roll, a tank within said camera, means for guiding and moving said layers across said tank, a rack for engaging into said tank and having a plurality of opposed grooves between which said layer of paper may pass and into which the edges of said film layer may engage, means for cutting off sections of said film layer after engagement into certain of said opposed grooves, means for moving said rack in steps into said tank to place the various pairs of opposed grooves in position to receive sections of said film layer, containers for liquid developer, bleach, water, fixer, etc., and means for selectively connecting said containers with said tank and for pumping said liquids back and forth from said containers to said tank, and vice-versa, said means for cutting off sections of said film layer includes a shaft turnably mounted and having a projecting end provided with a handle, cutting knives for cutting said film, and means for operating said cutting knives controlled with said shaft, said shaft being provided with projecting arms connected with arms connected to move one of said knives when the shaft is operated.

8. A self-developing camera, comprising a camera adapted to use a roll of film having a layer of film and a layer of paper or other material rolled into a roll, a tank within said camera, means for guiding and moving said layers across said tank, a rack for engaging into said tank and having a plurality of opposed grooves between which said layer of paper may pass and into which the edges of said film layer may engage, means for cutting off sections of said film layer after engagement into certain of said opposed grooves, means for moving said rack in steps into said tank to place the various pairs of opposed grooves in position to receive sections of said film layer, containers for liquid developer, bleach, water, fixer, etc. and means for selectively connecting said containers with said tank and for pumping said liquids back and forth from said containers to said tank, and vice-versa, said means for moving said rack including a screw rotatively mounted on the rack and extending to the exterior of the camera and threadedly engaging a stationary part, whereby the screw may be turned for moving the rack.

9. A self-developing camera, comprising a camera adapted to use a roll of film having a layer of film and a layer of paper or other sheet material rolled into a roll, a tank within said camera, means for guiding and moving said layers across said tank, a rack for engaging into said tank and having a plurality of opposed grooves between which said layer of paper may pass and into which the edges of said film layer may engage, means for cutting off sections of said film layer after engagement into certain of said opposed grooves, means for moving said rack in steps into said tank to place the various pairs of opposed grooves in position to receive sections of said film layer, containers for liquid developer, bleach, water, fixer, etc., and means for selectively connecting said containers with said tank and for pumping said liquids back and forth from said containers to said tank, and vice-versa, said means for moving said rack including a screw rotatively mounted on the rack and extending to the exterior of the camera and threadedly engaging a stationary part, whereby the screw may be turned for moving the rack, said screw being provided with an indicating line operating over a scale to indicate the various places of the rack.

10. A self-developing camera, comprising a camera adapted to use a roll of film having a layer of film and a layer of paper or other sheet material rolled into a roll, a tank within said camera, means for guiding and moving said layers across said tank, a rack for engaging into said tank and having a plurality of opposed grooves between which said layer of paper may pass and into which the edges of said film layer may engage, means for cutting off sections of said film layer after engagement into certain of said opposed grooves, means for moving said rack in steps into said tank to place the various pairs of opposed grooves in position to receive sections of said film layer, containers for liquid developer, bleach, water, fixer, etc., and means for selectively connecting said containers with said tank and for pumping said liquids back and forth from said containers to said tank, and vice-versa, said means for moving said rack including a screw rotatively mounted on the rack and extending to the exterior of the camera and threadedly engaging a stationary part, whereby the screw may be turned for moving the rack, said screw being provided with an indicating line operating over a scale to indicate the various places of the rack, said screw having a reduced top end which frees the rack when the rack is in its completely lowered position so that the screw may be reciprocated upwards and downwards for stirring the rack in said tank.

11. A self-developing camera, comprising a camera adapted to use a roll of film having a layer of film and a layer of paper or other sheet material rolled into a roll, a tank within said camera, means for guiding and moving said layers across said tank, a rack for engaging into said tank and having a plurality of opposed grooves between which said layer of paper may pass and into which the edges of said film layer may engage, means for cutting off sections of said film layer after engagement into certain of said opposed grooves, means for moving said rack in steps into said tank to place the various pairs of opposed grooves in position to receive sections of said film layer, containers for liquid developer, bleach, water, fixer, etc., and means for selectively connecting said containers with said tank and for pumping said liquids back and forth from said containers to said tank, and vice-versa, including a manually operable pump having a manually movable handle arranged upon the outside of said camera.

12. A self-developing camera, comprising a camera adapted to use a roll of film having a layer of film and a layer of paper or other sheet material rolled into a roll, a tank within said camera, means for guiding and moving said layers across said tank, a rack for engaging into said tank and having a plurality of opposed grooves between which said layer of paper may pass and into which the edges of said film layer may engage, means for cutting off sections of said film layer after engagement into certain of said opposed grooves, means for moving said rack in steps into said tank to place the various pairs of opposed grooves in position to receive sections of said film layer, containers for liquid developer, bleach, water, fixer, etc., and means for selectively connecting said containers with said tank and for pumping said liquids back and forth from said containers to said tank, and vice-versa, including a manually operable pump having a manually movable handle arranged upon the outside of said camera, and said pump being associated with an inlet valve for selectively controlling pipes connected with said tanks, and with an outlet valve for controlling the discharge from the pump to the tank.

13. A self-developing camera, comprising a camera adapted to use a roll of film having a layer of film and a layer of paper or other sheet material rolled into a roll, a tank within said camera, means for guiding and moving said layers across said tank, a rack for engaging into said tank and having a plurality of opposed grooves between which said layer of paper may pass and into which the edges of said film layer may engage, means for cutting off sections of said film layer after engagement into certain of said opposed grooves, means for moving said rack in steps into said tank to place the various pairs of opposed grooves in position to receive sections of said film layer, containers for liquid developer, bleach, water, fixer, etc., and means for selectively connecting said containers with said tank and for pumping said liquids back and forth from said containers to said tank, and vice-versa, said means for cutting off sections of said film including a pair of cooperating knives or blades, one of which is stationarily mounted and the other movably mounted, the paper layer of said film being engaged through an opening in one of said blades, the film layer being engaged between said blades, the film layer being of a greater width than the paper layer to engage the said grooves in the rack, and the paper layer being so narrow as to not engage said grooves.

14. A self-developing camera, comprising a camera adapted to use a roll of film having a layer of film and a layer of paper or other sheet material rolled into a roll, a tank within said camera, means for guiding and moving said layers across said tank, a rack for engaging into said tank and having a plurality of opposed grooves between which said layer of paper may pass and into which the edges of said film layer may engage, means for cutting off sections of said film layer after engagement into certain of said opposed grooves, means for moving said rack in steps into said tank to place the various pairs of opposed grooves in position to receive sections of said film layer, containers for liquid developer, bleach, water, fixer, etc., and means for selectively connecting said containers with said tank and for pumping said liquids back and forth from said containers to said tank, and vice-versa, said means for cutting off sections of said film including a pair of cooperating knives or blades, one of which is stationarily mounted and the other movably mounted, the paper layer of said film being engaged through an opening in one of said blades, the film layer being engaged between said blades, the film layer being of a greater width than the paper layer to engage the said grooves in the rack, and the paper layer being so narrow as to not engage said grooves, a light-proof block of felt or similar material being stationarily mounted to one of the sides of said blades, said felt block having two slots, one through which the layer of film passes and the other through which the layer of paper passes.

LOUIS M. KLEIN.